US006964164B1

(12) United States Patent
Langenfeld

(10) Patent No.: US 6,964,164 B1
(45) Date of Patent: *Nov. 15, 2005

(54) RETURN TO NEUTRAL DEVICE FOR A HYDRAULIC APPARATUS

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 127 days.

This patent is subject to a terminal disclaimer.

(21) Appl. No.: 10/386,867

(22) Filed: Mar. 12, 2003

Related U.S. Application Data

(63) Continuation-in-part of application No. 10/144,280, filed on May 10, 2002, now Pat. No. 6,701,825.

(60) Provisional application No. 60/290,838, filed on May 14, 2001, provisional application No. 60/439,765, filed on Jan. 13, 2003.

(51) Int. Cl.⁷ ............................................. F16D 39/02
(52) U.S. Cl. ......................................... 60/487; 92/12.2
(58) Field of Search ........................... 60/487; 91/505; 92/12.2

(56) References Cited

U.S. PATENT DOCUMENTS

| 2,474,706 A | 6/1949 | Wahlmark |
| 3,279,172 A | 10/1966 | Kudo et al. |
| 3,362,161 A | 1/1968 | Flint |
| 3,727,712 A | 4/1973 | Colloton |
| 4,116,292 A | 9/1978 | Todechini et al. |
| 4,174,013 A | 11/1979 | Yago |
| 4,283,962 A * | 8/1981 | Forster .................. 91/505 |
| 4,461,341 A | 7/1984 | Morrison |
| 5,078,222 A | 1/1992 | Hauser et al. |
| 5,207,144 A | 5/1993 | Sporrer et al. |
| 5,259,194 A | 11/1993 | Okada |
| 5,314,387 A | 5/1994 | Hauser et al. |
| 5,528,958 A | 6/1996 | Hauser |
| 5,622,051 A | 4/1997 | Iida et al. |
| 5,836,159 A | 11/1998 | Shimizu et al. |
| 5,918,691 A | 7/1999 | Ishii |
| 5,957,229 A | 9/1999 | Ishii |
| RE36,807 E | 8/2000 | Okada |
| 6,253,637 B1 | 7/2001 | Hauser et al. |
| 6,425,244 B1 | 7/2002 | Ohashi et al. |
| 6,701,825 B1 * | 3/2004 | Langenfeld .............. 92/12.2 |

FOREIGN PATENT DOCUMENTS

| JP | 08-219253 | 8/1996 |
| JP | 2000-9023 | 1/2000 |
| JP | 2000-71790 | 3/2000 |

* cited by examiner

*Primary Examiner*—F. Daniel Lopez
(74) *Attorney, Agent, or Firm*—Neal, Gerber & Eisenberg LLP

(57) ABSTRACT

In a hydrostatic device using an axial piston pump, a return plate is mounted so that it contacts the movable swash plate of the hydrostatic transmission. The plate is biased by a spring-type mechanism to force the swash plate to return to neutral, and the set position of the plate may be externally adjusted. A bias arm comprising a generally U-shaped member having spring mounted on either leg thereof may be engaged to the return plate.

25 Claims, 21 Drawing Sheets

US 6,964,164 B1

RETURN TO NEUTRAL DEVICE FOR A HYDRAULIC APPARATUS

CROSS-REFERENCE TO RELATED APPLICATION

This application is a continuation-in-part and claims the benefit of U.S. patent application Ser. No. 10/144,280 filed on May 10, 2002, now U.S. Pat. No. 6,701,825, which claims the benefit of U.S. Provisional Patent Application Ser. No. 60/290,838 filed May 14, 2001. This application also claims the benefit of U.S. Provisional Application Ser. No. 60/439,765 filed Jan. 13, 2003. These applications are incorporated herein by reference in their entirety.

BACKGROUND

This invention relates to an improved design of a variable displacement hydraulic unit such as a pump or hydrostatic transmission ("HST"), and in particular to an improved return to neutral feature. Hydrostatic transmissions and other hydraulic units using an axial piston design are well known in the art. While this invention will be generally described in connection with an HST, it is understood that this invention could be applied to a variety of hydrostatic units, such as stand-alone pumps using external hoses. The invention described herein can also be adapted for use in an integrated hydrostatic transmission ("IHT") incorporating output gearing and axles, and a wide variety of uses, including vehicles and industrial applications.

In general, an HST has a hydraulic pump and a hydraulic motor mounted in a housing. The pump and motor are hydraulically linked through a generally closed circuit, and both consist of a rotatable body with pistons mounted therein. Hydraulic fluid such as oil is maintained in the closed circuit, and the HST generally has a sump or reservoir with which the closed circuit can exchange oil. This sump may be formed by the housing itself.

The pump is usually driven by an external motive source such as pulleys or belts connected to an internal combustion engine. The axial pistons of the pump engage a moveable swash plate and, as the pump is rotated by an input source driven by the external engine, the pistons engage the swash plate. Movement of the pump pistons creates movement of the hydraulic fluid from the pump to the motor, causing rotation thereof. The axial pistons of the motor are engaged against a fixed plate, and rotation of the motor drives an output shaft engaged thereto. This output shaft may be linked to mechanical gearing and output axles, which may be internal to the HST housing, as in an IHT, or external thereto. The swash plate is generally controlled by a control arm which is connected via linkage to either a hand control or foot pedal mechanism which the vehicle operator uses to control direction and speed.

The pump system is fully reversible in a standard HST. As the swash plate is moved, the rotational direction of the motor can be changed. The HST closed circuit has two sides, namely a high pressure side in which oil is being pumped from the pump to the motor, and a low pressure or vacuum side, in which oil is being returned from the motor to the pump. When the swash plate angle is reversed, the flow out of the pump reverses so that the high pressure side of the circuit becomes the vacuum side and vice versa. This hydraulic circuit can be formed as porting formed within the HST housing, or internal to a center section on which the pump and motor are rotatably mounted, or in other ways known in the art. Check valves are often used to draw hydraulic fluid into the low pressure side to make up for fluid lost due to leakage, for example.

The hydrostatic pump described herein has a "neutral" position where the pump pistons are not moved in an axial direction, so that rotation of the pump does not create any movement of the hydraulic fluid. Where the pump pistons move vertically, the swash plate is in neutral when it is generally horizontal with respect to the pump pistons. The swash plate need not be horizontal in the neutral position, depending on the orientation of the pump, but it will be generally perpendicular to the pump pistons in the neutral position.

For safety reasons, and for the convenience of the user, it is preferred to have a return to neutral, or zero displacement, feature, which forces the swash plate to its neutral position when no force is being applied to the control arm. Such devices are important for vehicle safety, to eliminate unintended movement of the vehicle, and to return the unit to neutral in the event of an accident where the vehicle operator is unable to physically disengage the transmission. Such return to neutral devices generally involve a spring mechanism engaged to the control arm to force the control arm to a neutral position, which then returns the swash plate to a neutral position. These may be located external to the housing or internally.

One example of a device used to maintain a hydrostatic unit in the zero displacement mode is shown in U.S. Pat. No. 5,207,144. While that design incorporates a spring mechanism to force a return to neutral, the reciprocal follower used to contact the swash plate does not separately pivot itself, leading to binding problems.

SUMMARY OF THE INVENTION

The invention provides an improved return design for a swash plate used with a variable displacement hydraulic pump, and this invention could be adapted for use with any swash plate or equivalent structure in any hydrostatic application. The swash plate has a neutral position wherein the thrust bearing engaging the pump pistons is generally perpendicular to the pistons. This invention uses a separate member such as a plate which directly engages the swash plate. This separate member, or return plate, rotates about an axis with movement of the swash plate; it is also engaged to a preload spring mechanism which acts to force the return plate to a set position that in turn forces the swash plate to a conforming position, which is preferably but not necessarily the neutral position. The preload spring keeps the return plate biased against the housing sockets and the swash plate. The separate return plate can be mounted in a variety of places with respect to the swash plate or can be of different sizes and the location of its axis of rotation simply needs to be altered to reflect such changes.

The present invention not only returns the unit to a set position, but also helps to maintain the unit in this position. Specifically, a stroking force applied to the swash plate through a control arm or similar mechanism causes rotation of the swash plate and the swash plate, in turn, presses on one side of the return plate. The return plate then transmits a restoring force from the spring mechanism to the swash plate, through one contact point. When the stroking force is removed and the swash plate is rotated back to the set position, both contact points are engaged against the swash plate. The force balance between the two contact points keeps the swash plate at the desired set position. The force balance eliminates the dead band found in other return to neutral devices. An optional adjustment feature can be incorporated at the return plate hinge or the swash plate contact points, and can be accessed from outside the housing by means of an external screw. This adjustability eliminates many of the problems heretofore seen with other designs, as the present unit may be adjusted to compensate for design tolerances, wear or contamination, any one of which may otherwise make the actual set position differ from the desired set position.

A second embodiment has the return plate being fitted around the pump cylinder block to provide a more compact design. With such an arrangement, however, the cylinder block prevents mounting the preload spring along the required line of action relative to the return plate. In this embodiment, a second plate, referred to as a preload plate, is used to transmit force from an offset mounted spring to the return plate through two contact points. The correct spring force line of action on the return plate is obtained by the geometry of the preload plate contact points and the spherical pivot of the preload plate. This embodiment enables the use of a more compact design where such may be appropriate.

Further objects and benefits of the invention will be apparent to one skilled in the art.

DETAILED DESCRIPTION OF THE INVENTION

Figure 1:
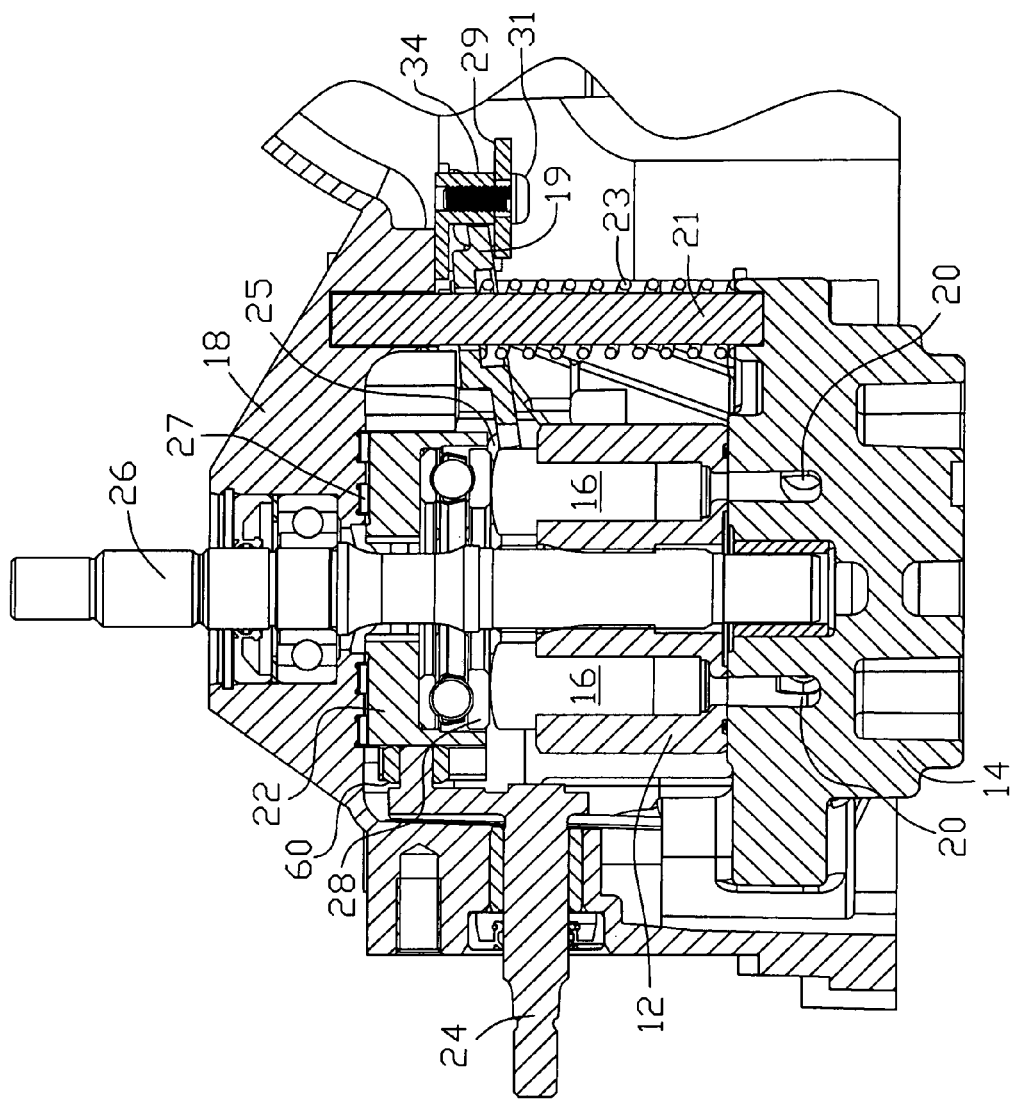
FIG. 1 is a cross-sectional view of a hydraulic pump using a return plate in accordance with the present invention.
Figure 4:
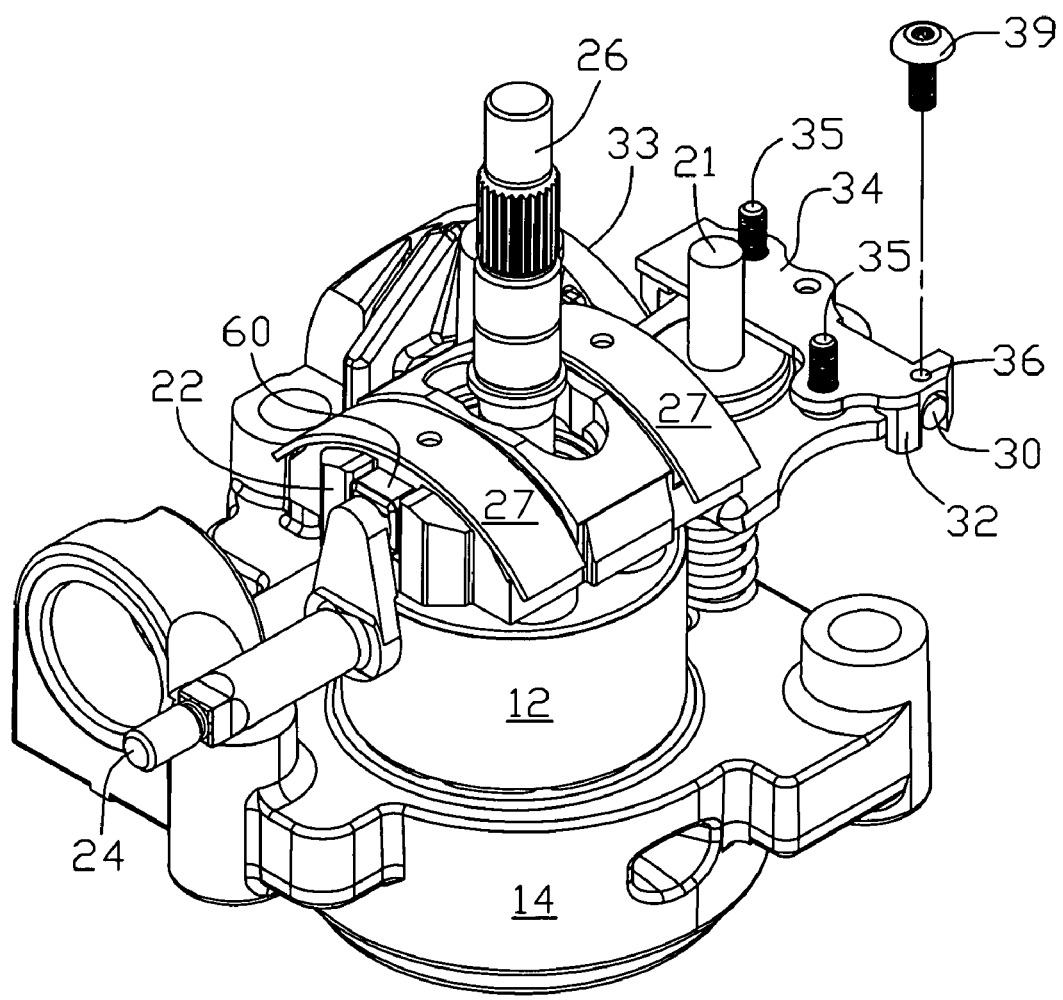
FIG. 4 is a perspective view of a center section, pump and swash plate incorporating this invention, with the unit in the neutral position.
Figure 5:
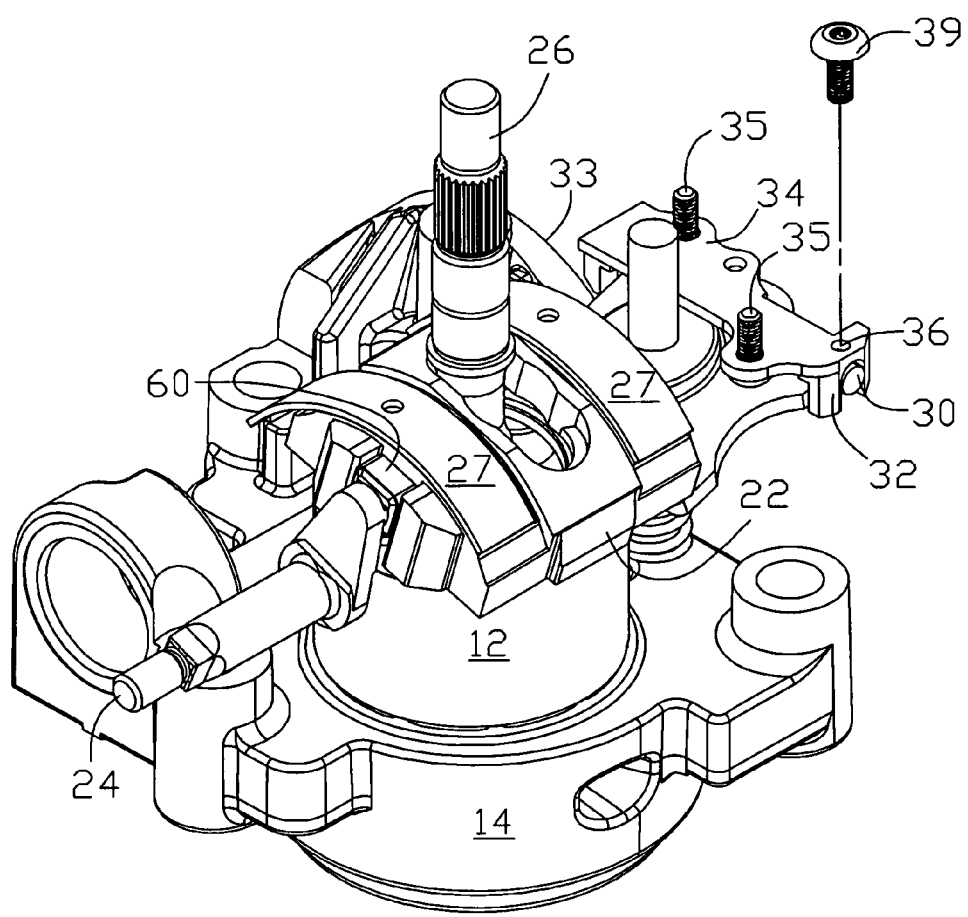
FIG. 5 is a perspective view of the center section, pump and swash plate of the present invention, with the unit in a stroked position.

FIG. 1 shows a cross-sectional view of a standard hydraulic pump as may be used in a hydrostatic application. FIGS. 4 and 5 show certain components of a typical hydrostatic application incorporating the present invention, namely a hydrostatic pump rotatably mounted on a center section. The operation of a hydrostatic application such as a pump, HST or IHT are generally known in the art and will not be described in detail herein. For example, the arrangement of pump 12, center section 14 and the hydrostatic motor are generally described in U.S. Pat. No. 5,314,387, the terms of which are incorporated herein by reference. As noted, this invention could be used in a device having only a pump 12 without the separate hydraulic motor, or with the motor in a separate housing.

Pump cylinder block 12 is rotatably mounted on center section 14, which includes a plurality of hydraulic porting 20 to transfer hydraulic fluid to another component, such as external hoses (not shown) or a hydraulic motor (not shown). A plurality of pump pistons 16 are mounted in cylinder block 12, which is driven by input shaft 26. The motor (not shown) would be mounted on motor running surface 33 of center section 14. The above elements are generally mounted internal to housing 18. Center section 14 and the other components could take on a variety of other shapes and arrangements. By way of example only, the pump and motor cylinder blocks need not be at right angles to one another but could also be in a parallel or back-to-back arrangement, and center section 14 could be formed in the shape of a plate or other structure, or could be formed as part of housing 18. Similarly, for convenience only the upper portion of housing 18 is shown in these figures; the embodiment shown is of a horizontal split line, where upper housing 18 and a corresponding lower housing (not shown) are joined at a split line perpendicular to pump input shaft 26. It will be understood that other housing arrangements and designs could be substituted for this housing shown within the scope of this invention.

Pump pistons 16 are engaged and rotate against swash plate bearing 28. When the unit is in neutral, swash plate bearing 28 is generally perpendicular to input shaft 26. Trunnion arm 24, which may extend out of housing 18, is used to control the direction of swash plate 22, which can rotate about an axis parallel to the plane of the page, as shown in FIG. 1. A slider block 60 may be provided on the side of swash plate 22 and connected to trunnion arm 24 or the like to rotate swash plate 22. Swash plate 22 is mounted on and moves against cradle bearings 27 which engage housing 18.

Figure 3:
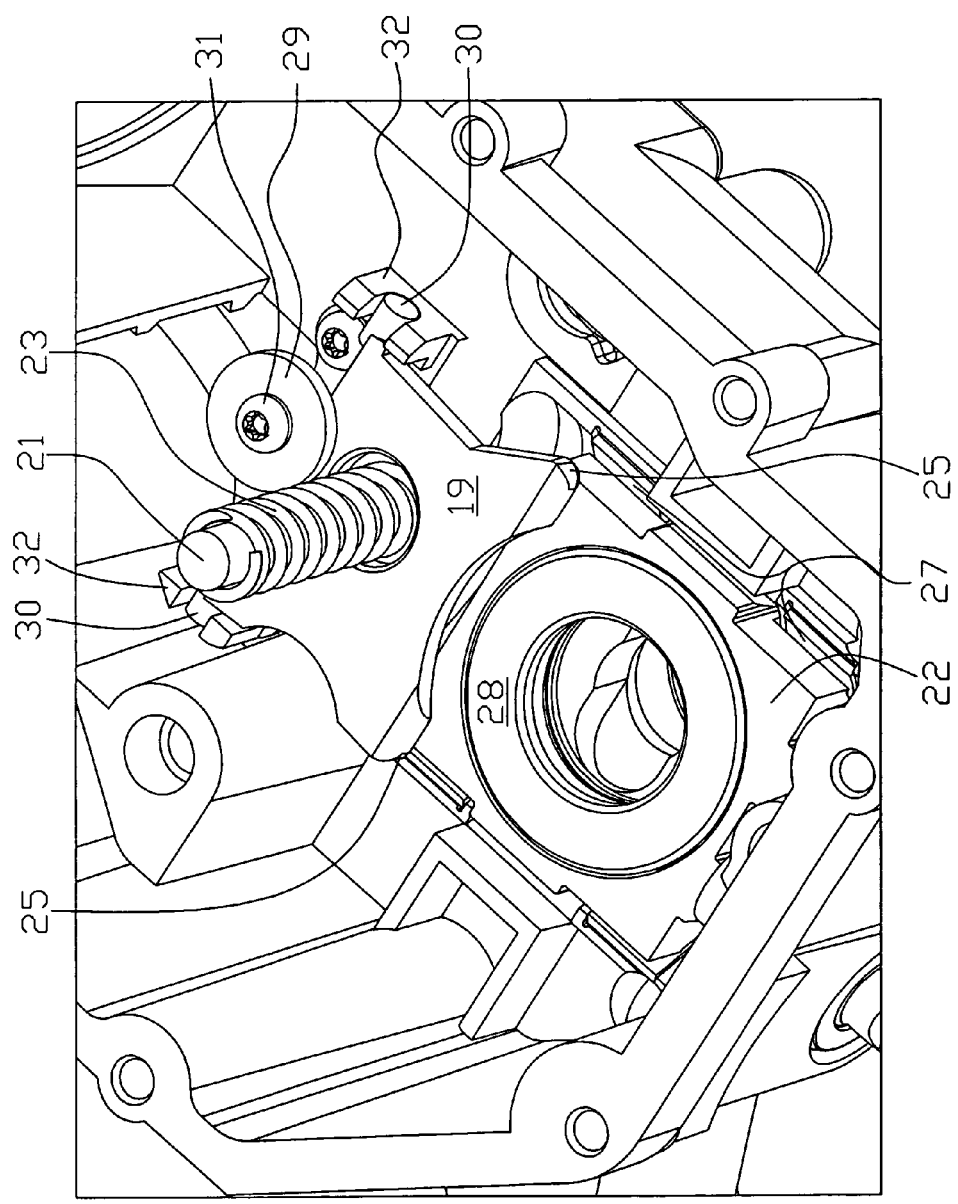
FIG. 3 is perspective view of the swash plate and return plate of FIG. 2, where the hydrostatic unit is in the neutral position.

Return plate 19 is mounted inside housing 18 in contact with swash plate 22. Spring 23 forces return plate 19 against swash plate 22 and pivot housings 32. Return plate 19 includes a pair of projections 25 and a pair of pivot pins 30. The position shown in FIG. 3, where both pins 30 contact pivot housings 32 and projections 25 engage swash plate 22 due to the force of spring 23 on return plate 19, may be referred to as the set position, which is most likely the neutral position. In certain applications the set position may not be set at neutral but could rather be set at a stroked position, depending on the design requirements.

Figure 2:
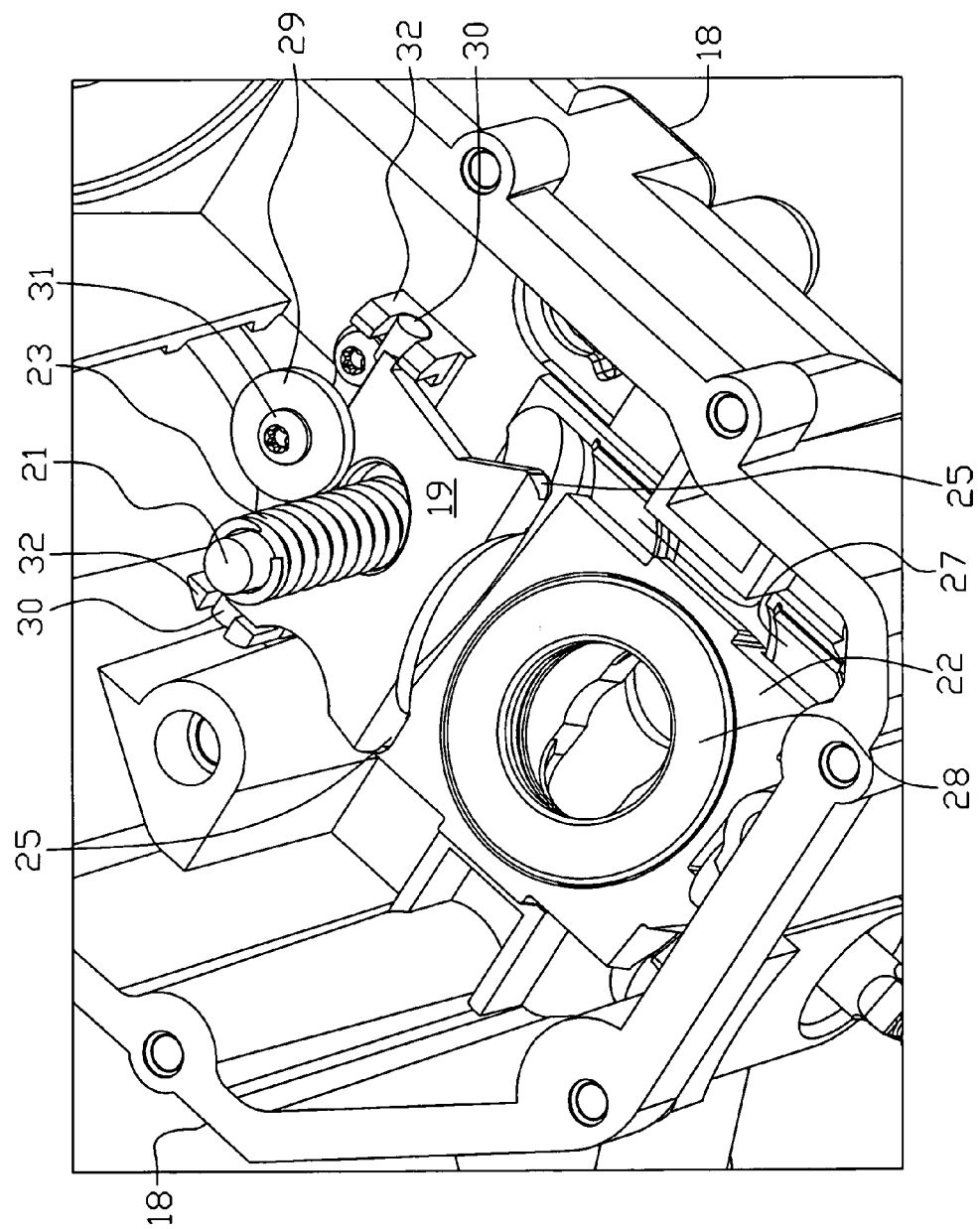
FIG. 2 is a perspective view of a swash plate and single return plate in accordance with this invention, and mounted in a transmission housing, with the unit in a stroked position.
Figure 6:
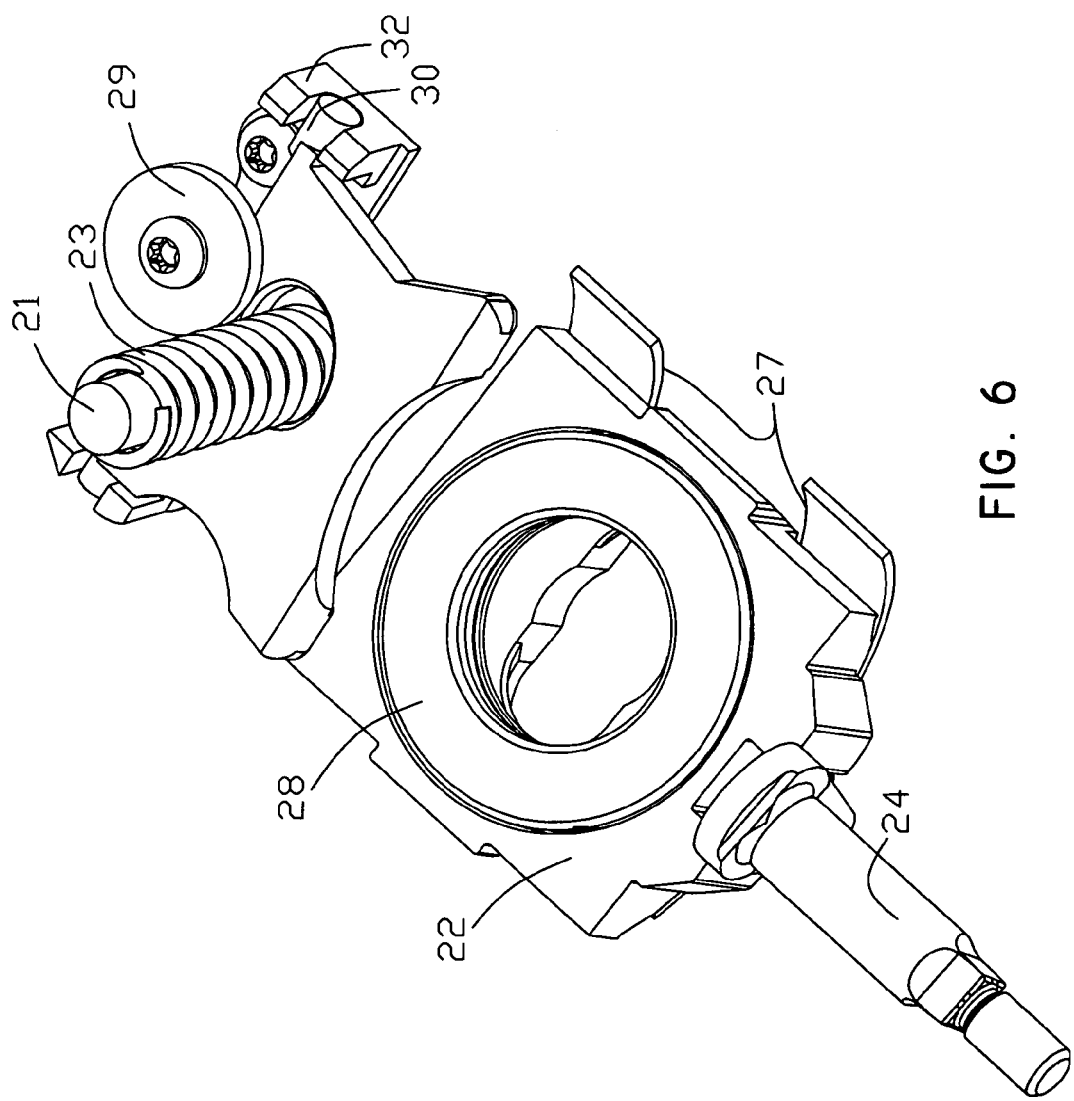
FIG. 6 is a perspective view of a swash plate and a portion of the return to neutral feature of the present invention, where the swash plate is in a stroked position.

When the unit is stroked in one direction, as can be seen most clearly in FIGS. 2 and 6, swash plate 22 will press against one of the projections 25, causing return plate 19 to pivot along the axis perpendicular to the page, as shown in FIG. 1, and thus causing compression of spring 23. The return force of spring 23 acts to counter the rotation of swash plate 22, biasing return plate 19 to the set position, which in turn forces swash plate 22 to the set position.

Pins 30 may be formed as an integral part of return plate 19, or secured to return plate 19 in some other manner. Pins 30 are mounted in pivot housings 32 which may be formed as part of transmission housing 18, or as a separate bracket 34 attached to housing 18 through screws 35, and act as a hinge to allow a separate pivoting of return plate 19. The pivot axis of return plate 19 is different from the pivot axis of swash plate 22, and in the embodiment shown they are perpendicular. The ability of return plate 19 to pivot about such a separate pivot axis (as opposed to, e.g., sliding) reduces the risk of binding return plate 19 as spring 23 is compressed, as shown in FIG. 6. Other hinge mechanisms could also be used to create the pivot. It is important to note that return plate 19 is not constrained by shaft 21; rather, it is located by pins 30, thus providing the pivoting action for return plate 19. Spring 23 and shaft 21 need not extend through return plate 19; they can be so extended for ease of manufacturing and assembly.

Figure 9:
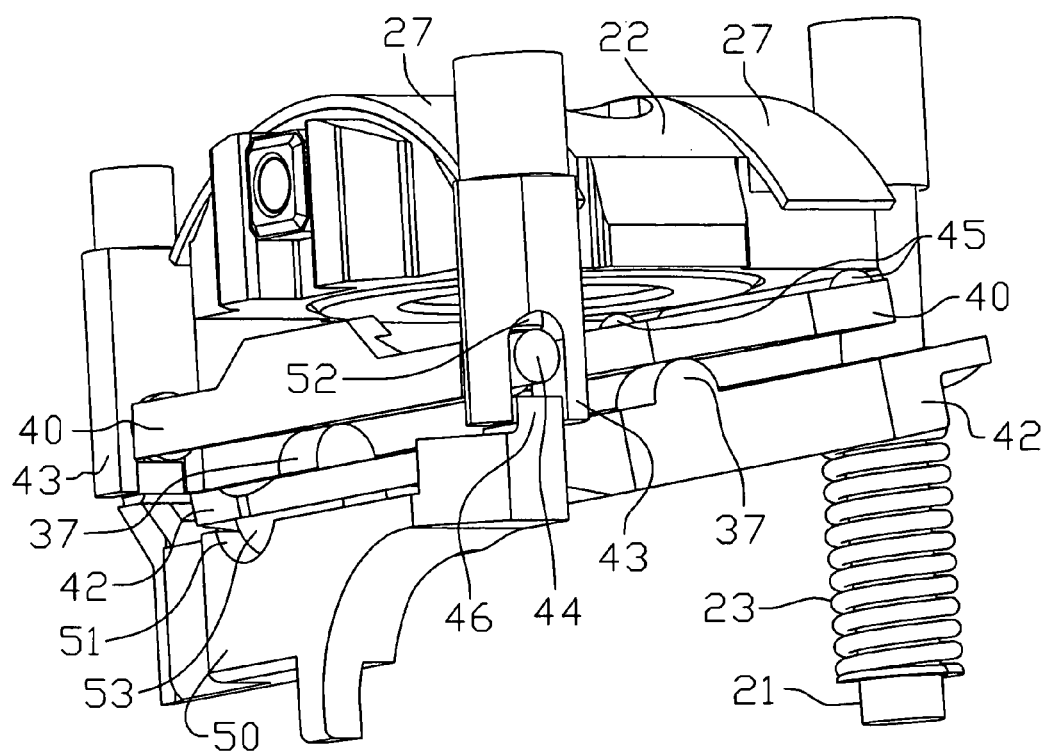
FIG. 9 shows a perspective view of a swash plate and return mechanism of a second embodiment of the invention, where the swash plate is in the neutral position.
Figure 10:
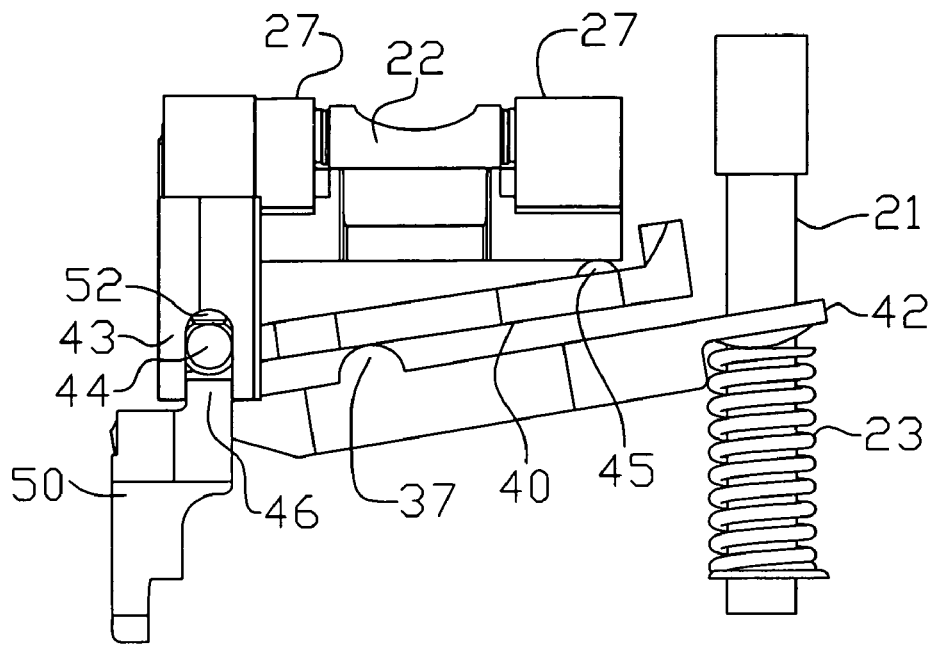
FIG. 10 is a side view of certain components of the second embodiment of this invention, with the swash plate in the neutral position.
Figure 11:
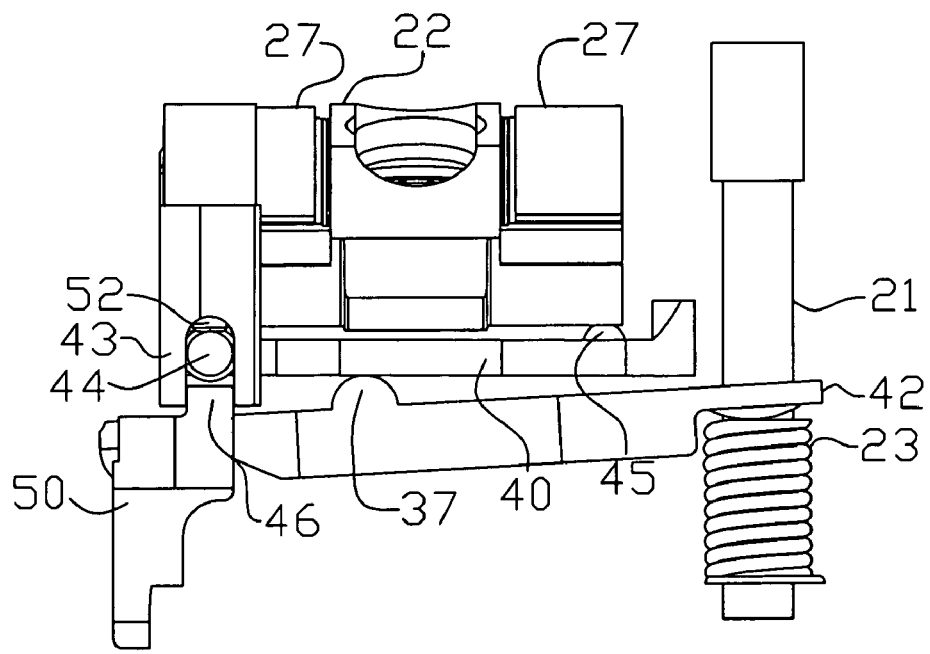
FIG. 11 is a side view of the components shown in FIG. 10 with the swash plate in a stroked position.
Figure 12:
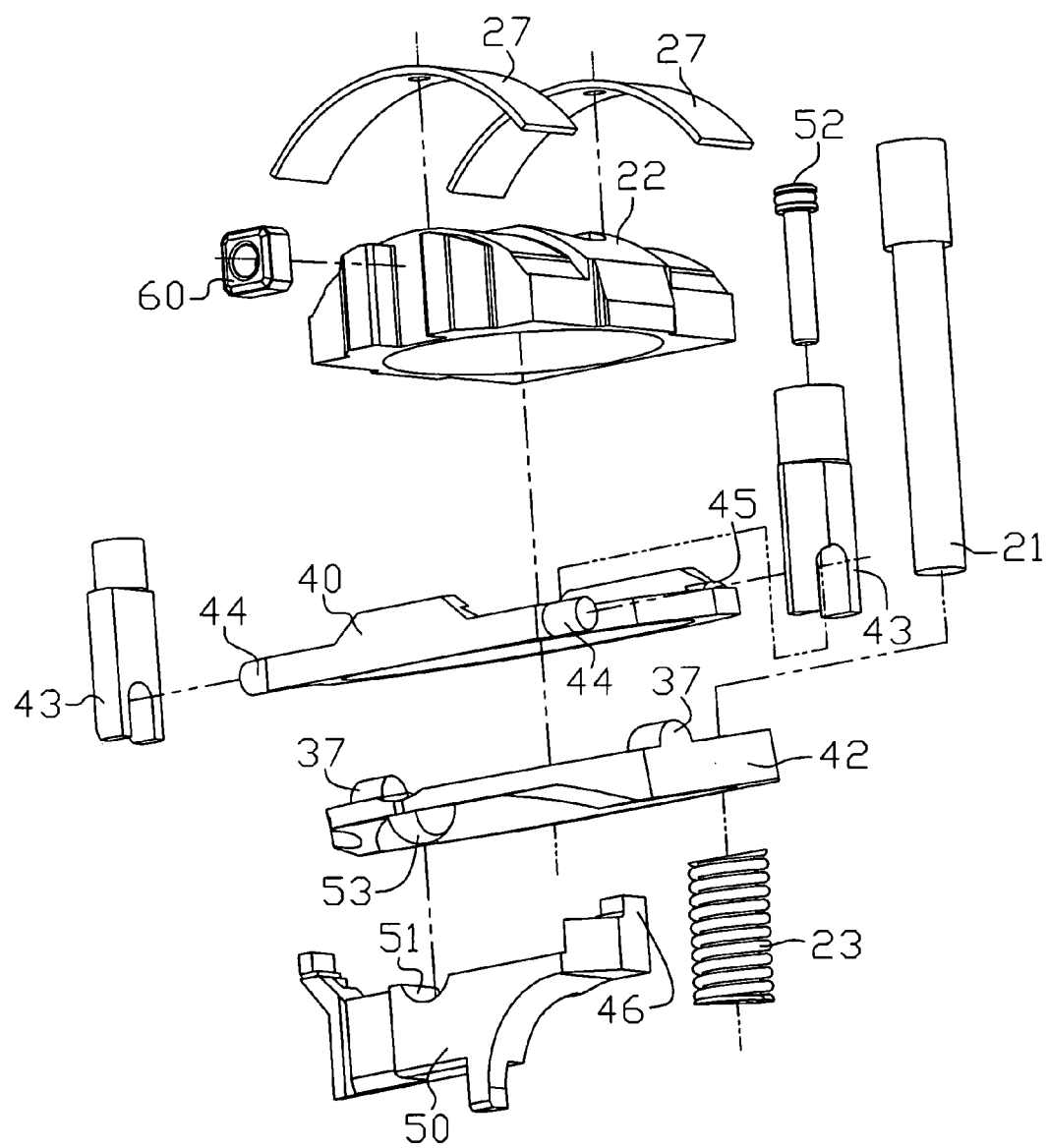
FIG. 12 is an exploded perspective view of the components of the second embodiment of this invention.
Figure 13:
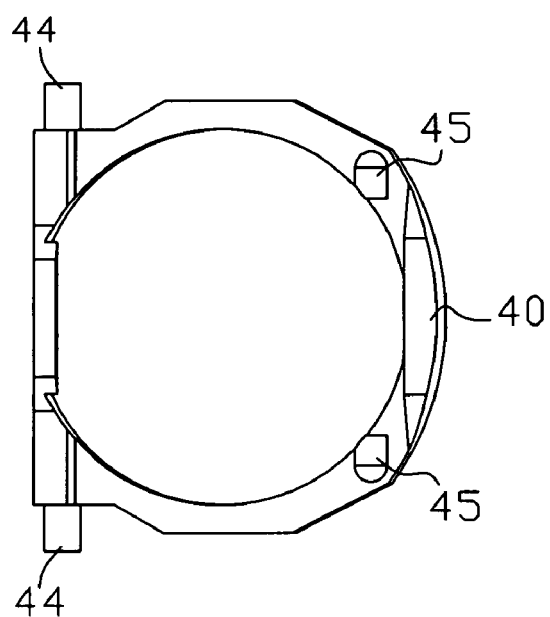
FIG. 13 is a plan view of the return plate of the second embodiment of this invention.
Figure 14:
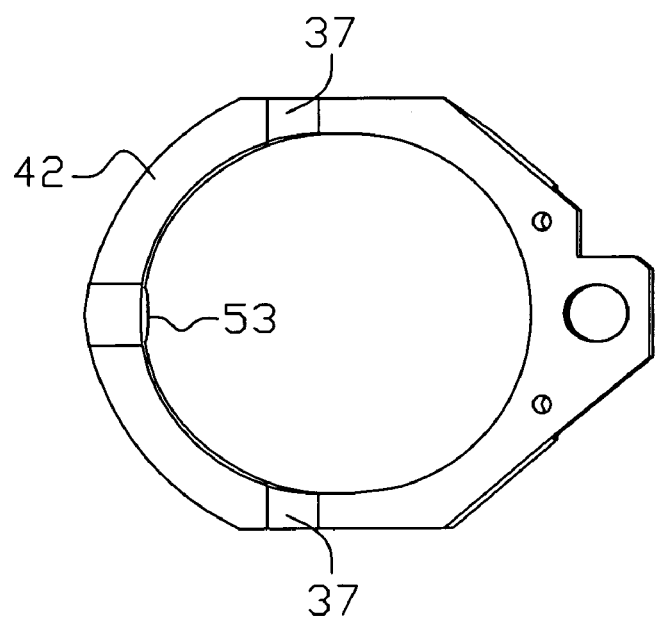
FIG. 14 is a plan view of the preload plate of the second embodiment of this invention.

Washer 29 is an optional safety feature in that it acts as a supplemental means for maintaining return plate 19 in the proper position, e.g., during assembly or if the unit receives an external force. Washer 29 may be secured by a screw 31 or similar device. Other methods of maintaining return plate 19 in place could also be used, such as housing projections or a bracket, as shown in FIGS. 9 and 12.

Spring 23 is shown in this embodiment as being mounted around rod 21, which is supported by housing 18 and center section 14. It is understood that other support mechanisms for spring 23, or even other arrangements of the spring could be used in accordance with this invention. Any device to provide a spring return force to return plate 19 could be used in place of coil spring 23 shown.

The adjustability of the internal return to neutral feature of the present invention is shown in FIGS. 4 and 5. Specifically, adjustment screw 39 extends through hole 36 in bracket 34 to contact pin 30. Rotation of screw 39 in either direction will move return plate 19, allowing the set position of return plate 19 to adjusted as needed. Adjustment screw 39 extends outside of the transmission housing 18, through an opening that should be sealed in some manner to prevent oil leakage. Different adjustment mechanisms could also be used within the spirit of this invention. For example, if pin 30 was a different shape, a wedge device could be inserted between it and the bracket, and movement of the wedge in or out would provide the adjustment.

A second embodiment of this invention is shown in FIGS. 7–14, where identical element numbers denote common elements. This embodiment allows for a different arrangement of elements to accommodate smaller housing designs or the use of additional equipment which may require certain space within the housing.

In this embodiment, return plate 40 is shaped to fit around cylinder block 12 with pivot pins 44 and projections 45 on opposite sides of cylinder block 12. However, this arrangement precludes the desired location of the return spring element between pivot pins 44 and projections 45. Thus, the second embodiment uses a preload plate 42 which is directly engaged to the spring 23 and which engages return plate 40 at projections 37. As swash plate 22 is moved out of the set position, it will exert a force upon one or the other of the projections 45, causing a rotation of return plate 40 about its pivot point, which in this embodiment is about an axis between pins 44. In this embodiment, pins 44 are formed as a part of return plate 40 and are mounted in pivot housings 43. Pivot housings 43 are shown as being formed separately from main housing 18, although they could also be formed integrally therewith. The optional safety function similar to that served by washer 19 of the first embodiment is served by projections 46 which are shown as being formed as integral to support bracket 50. Bracket 50 is shown as a separate element secured within housing 18; it may also be formed integrally as a portion of the housing or center section 14. Preload plate 42 has a spherical or multi-axis pivot 53 that mates with slot 51 formed on bracket 50. Pivot 53 allows preload plate 42 to contact return plate 40 at projections 37 with generally equal forces as return plate 40 is moved by swash plate 22 and by changes to adjustment screw 52. The function of pivot 53 may also be accomplished by other support arrangements that would enable the motions of pivot 53 as disclosed. Slot 51 allows pivot 53 and thus preload plate 42 to move generally perpendicular to pin 21 to prevent binding of preload plate 42. Slot 51 could be replaced by a socket in bracket 50 to receive pivot 53 and a longer slot in preload plate 42 to provide for clearance for pin 21.

Figure 7:
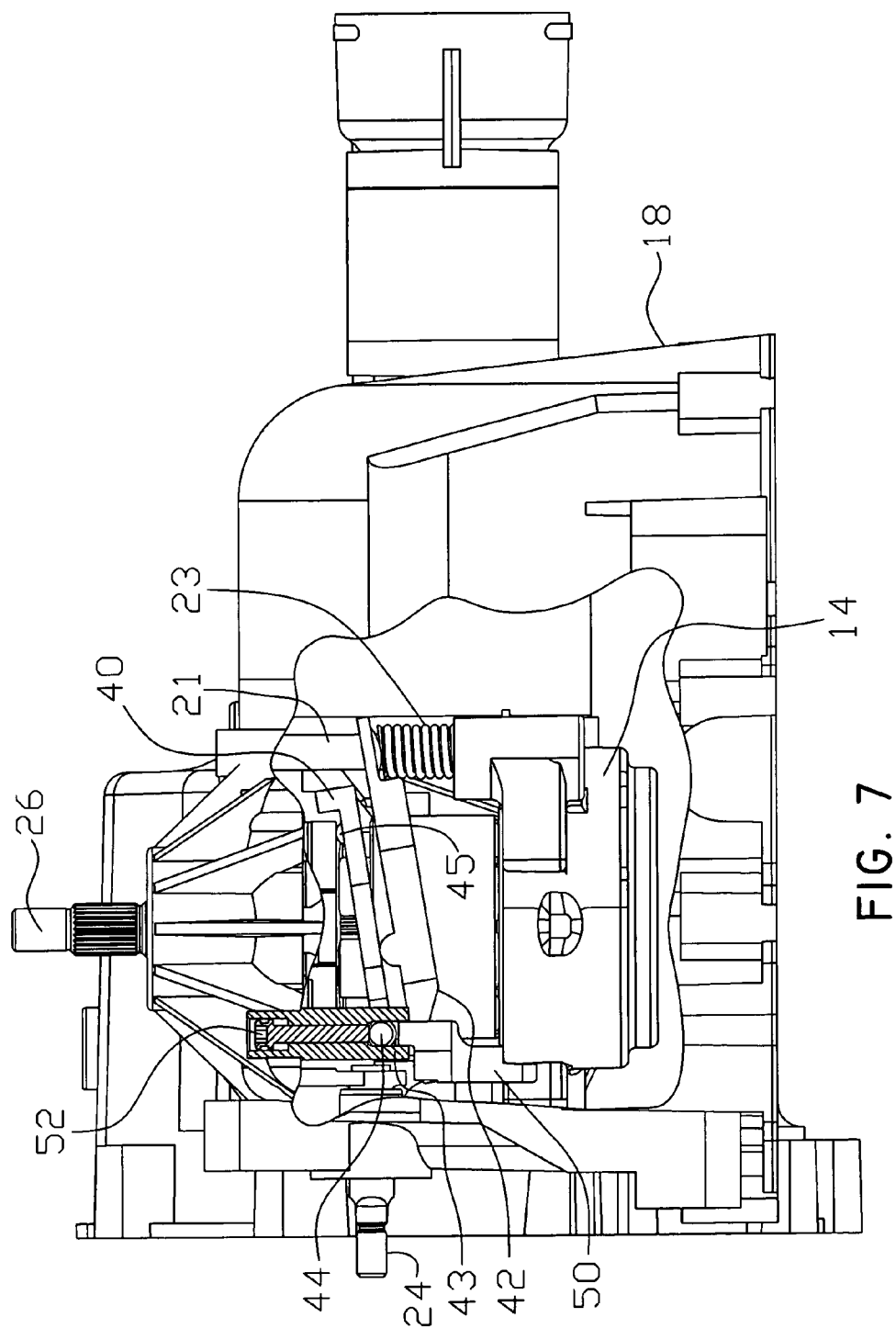
FIG. 7 is a partial cross-sectional view of a second embodiment of this invention, with certain elements removed for clarity.
Figure 8:
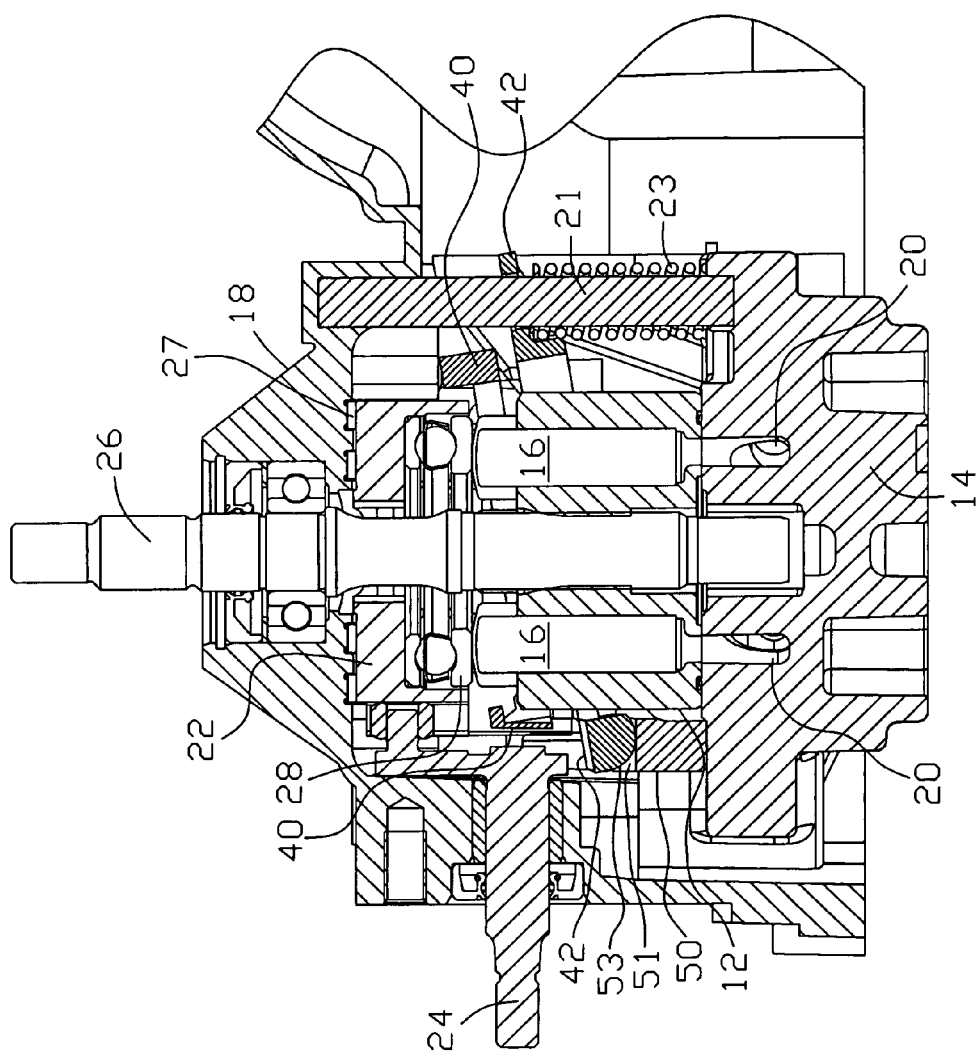
FIG. 8 shows a cross-sectional view of a second embodiment of this invention.

As shown most clearly in FIGS. 7 and 9, adjustment screw 52 extends through pivot housing 43 and can extend out of the transmission housing 18 to permit adjustment. It may be sealed through an o-ring at the head thereof or some other known method.

Preload plate 42 is engaged to spring 23, which could be any type of spring return mechanism. Preload plate 42 also includes a series of projections 37 to engage return plate 40 and bias it to the set position, which would force swash plate 22 to the set position. The location of projections 37 on preload plate 42 closer to pins 44 than to spring 23 acts to prevent pins 44 from lifting out of pivot housings 43 when the unit is in stroke. One could modify the radius of projections 37 or use a series of projections 37 on preload plate 42 in conjunction with modifying the location of the pivot point of preload plate 42 with respect to the pivot point of return plate 40 to change the return force as the unit moves away from the set position. As an example, a reduced return force in stroke could make it easier for an operator to maintain the unit in stroke compared to a similar unit without such a modification, while achieving the appropriate amount of return force as the unit nears the set position.

Figure 15:
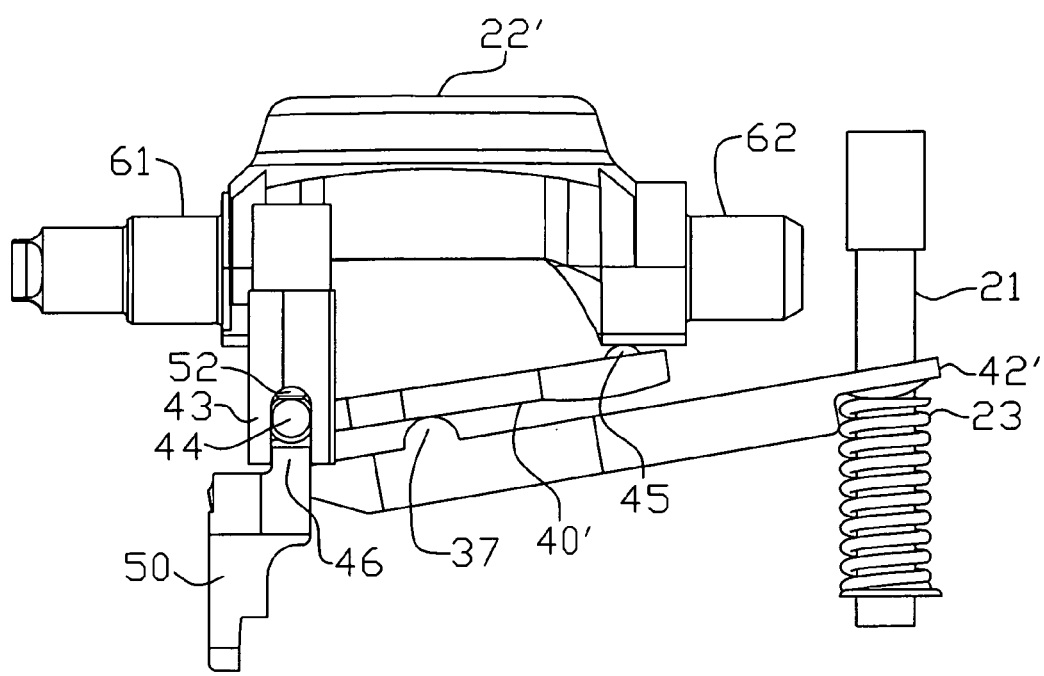
FIG. 15 is a side view of a third embodiment of the invention.
Figure 16:
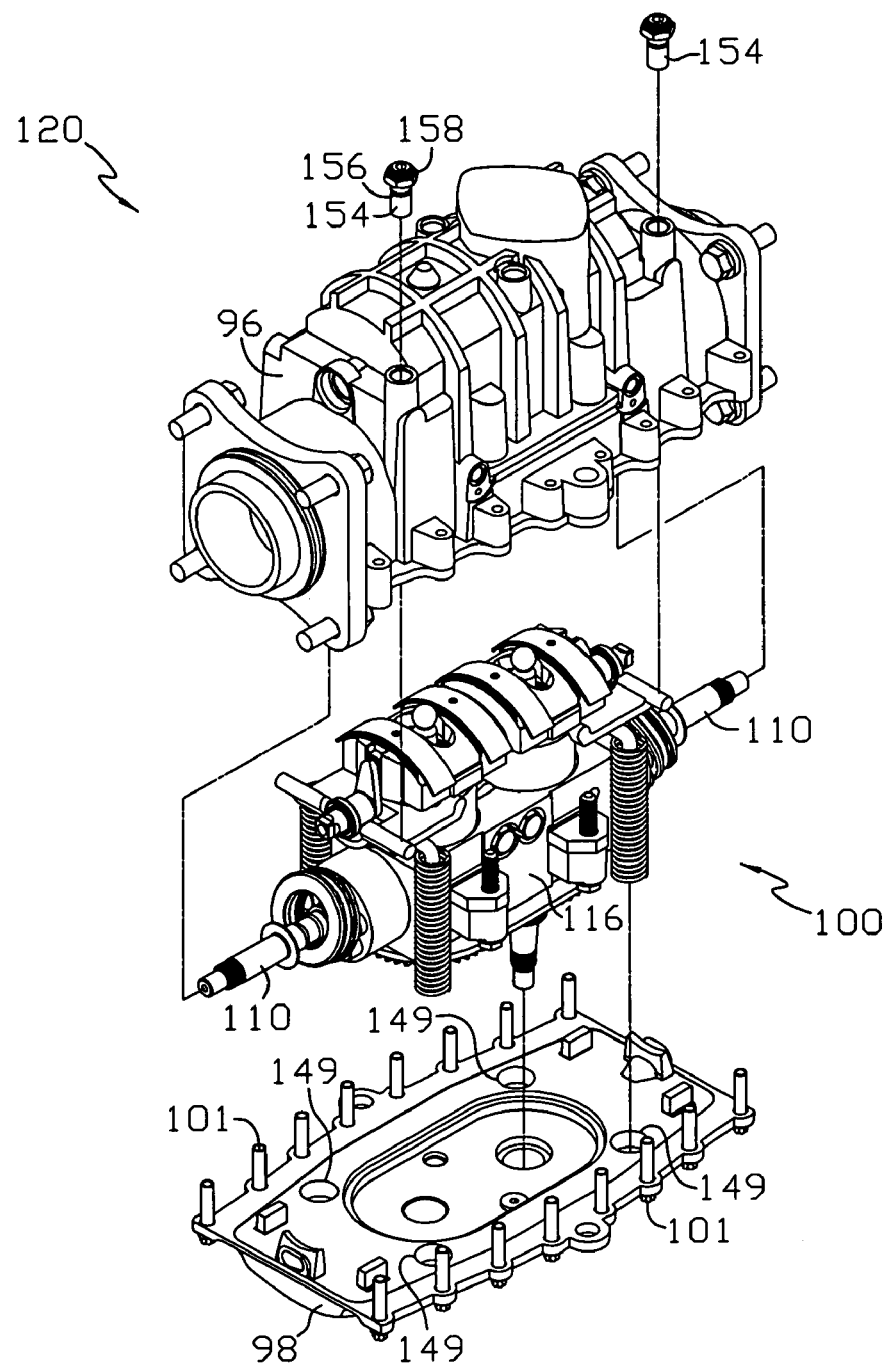
FIG. 16 is an exploded perspective view of the transmission portion of another embodiment of the present invention, with certain elements removed for clarity.
Figure 17:
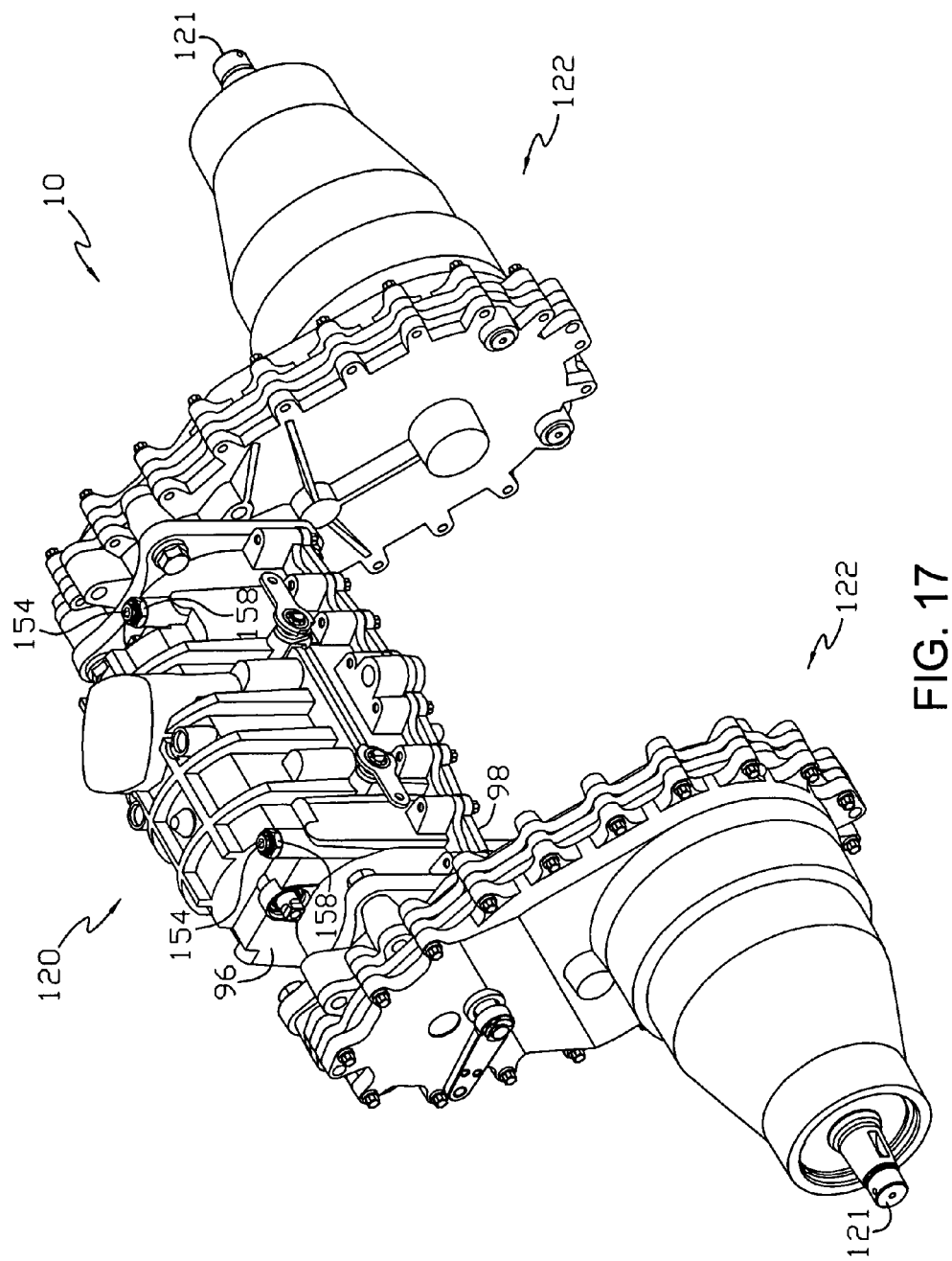
FIG. 17 is a perspective view of a transaxle incorporating the transmission shown in FIG. 16.

The various embodiments shown in FIGS. 1–14 depict a cradle-mounted swash bearing, but other designs could be used. For example, FIG. 15 shows a trunnion mounted swash plate 22' having a first trunnion 61 which would extend out of the device housing to be attached to a control device or the like (not shown) and a second trunnion 62 which would be rotatably mounted in a opening in the housing or some similar structure. Return plate 40' would be shaped to accommodate the shape of swash plate 22'. Other elements could be substantially identical to the embodiment shown in FIGS. 7–14. It will be understood by one of skill in the art that trunnion mounted swash plate 22' could also be used with the embodiment shown in FIGS. 1–6.

Another embodiment of a transmission having an internal return to neutral feature is shown in FIGS. 16–23. This embodiment is preferably for use in a zero turn transaxle 10 such as that depicted in FIG. 17, where a transmission 120 is secured to a pair of axle housings 122, each having an output axle 121 mounted therein. The transmission 120 comprises a main housing 96 having a cover 98 mounted thereon and secured thereto by means of bolts 101; it will be understood that the specific design of the transmission 120 and axle housings 122 are not required for the present invention and this invention could be readily used with other transaxle designs. For example, while this embodiment is shown as a dual hydrostatic transmission having a pair of pumps and motors, it could be used with a single pump and motor combination as well.

Transmission 120 includes a hydrostatic transmission 100 mounted in housing 96 and having a pair of hydraulic pump cylinder blocks 118 mounted on a mounting member or center section 116. A plurality of pump pistons 124 are mounted in each pump cylinder block 118. Pump swash plates 126 are moveable to control the hydraulic output of the cylinder blocks 118.

A pair of hydraulic motor blocks 206 are mounted on opposite ends of center section 116. A plurality of motor pistons 208 are mounted in each motor cylinder block 206. Pump input shaft 106 drives at least one and can drive both of the pump cylinder blocks 118. In this embodiment, first input shaft 106 is connected to and drives second input shaft 107 through gears 160. Hydraulic porting (not shown) is formed in center section 116 to connect each pump cylinder block 118 to its respective motor cylinder block 206. A motor shaft 1110 is engaged to and driven by each motor cylinder blocks 206, and each motor shaft 110 extends into the respective axle housing 122, where it engages a drive train (not shown) to drive output axle 121.

Figure 18:
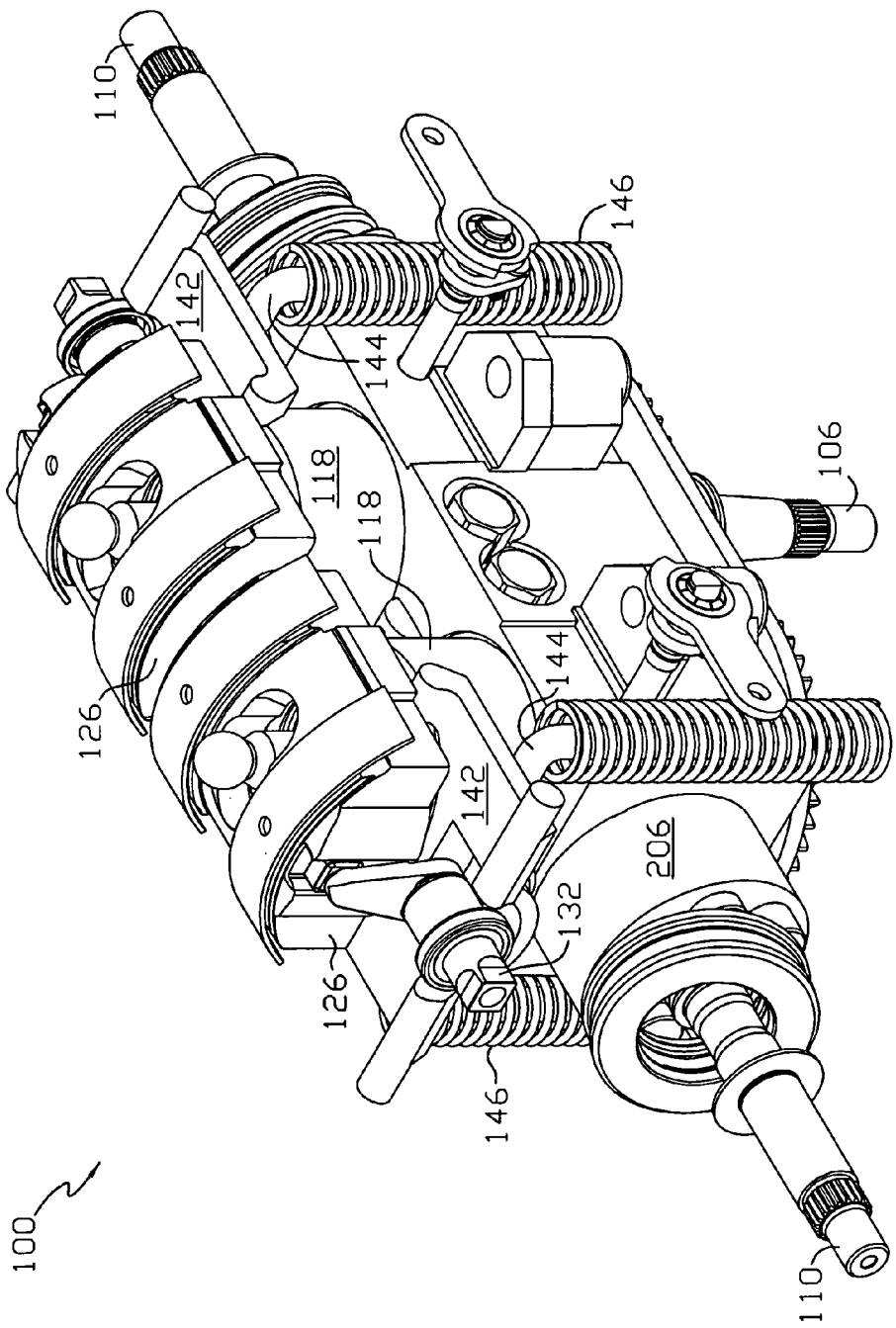
FIG. 18 is a perspective view of the hydrostatic components of the transmission portion of the embodiment shown in FIG. 16.
Figure 19:
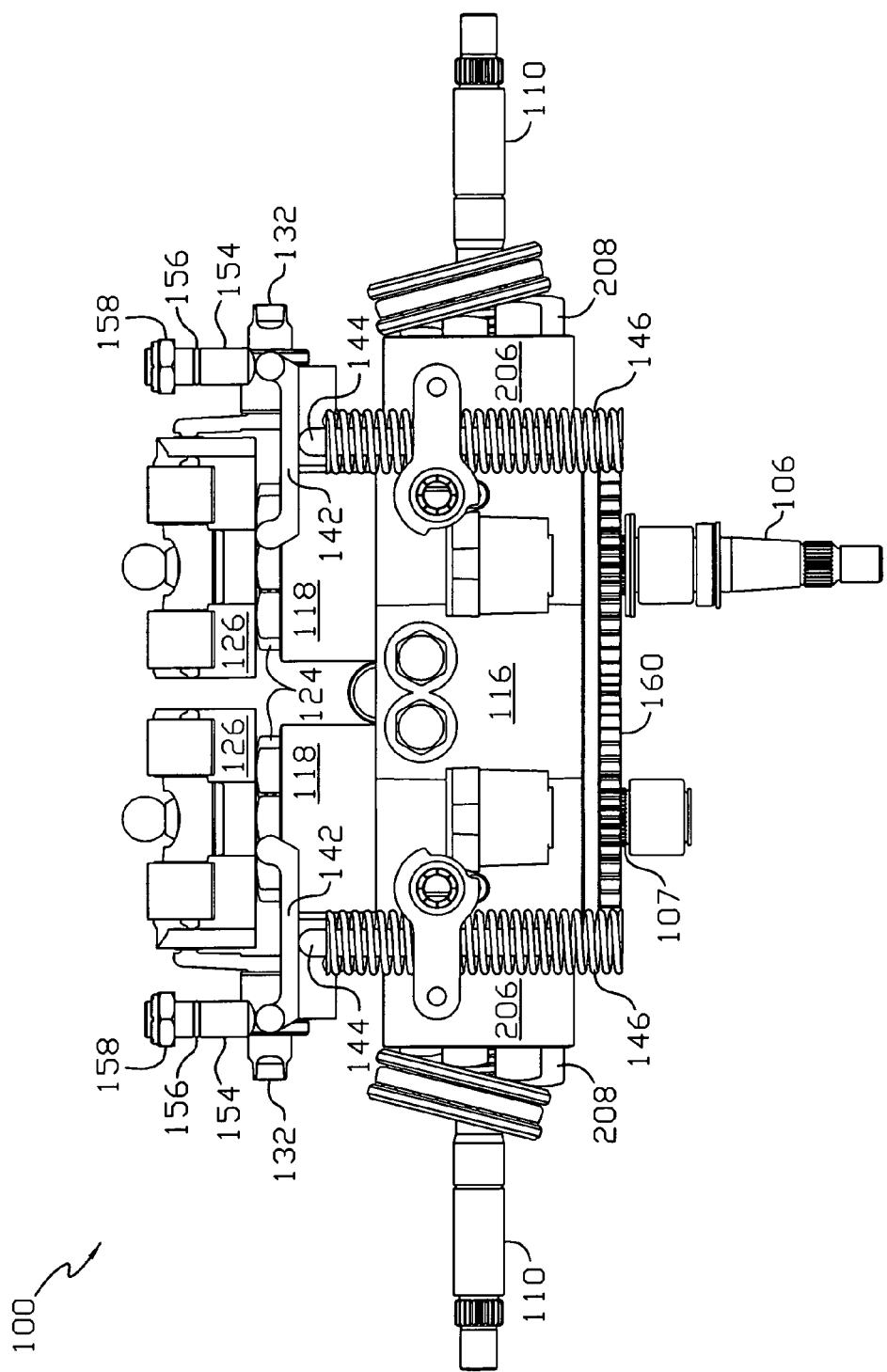
FIG. 19 is a side elevational view of the hydrostatic components shown in FIG. 18.
Figure 20:
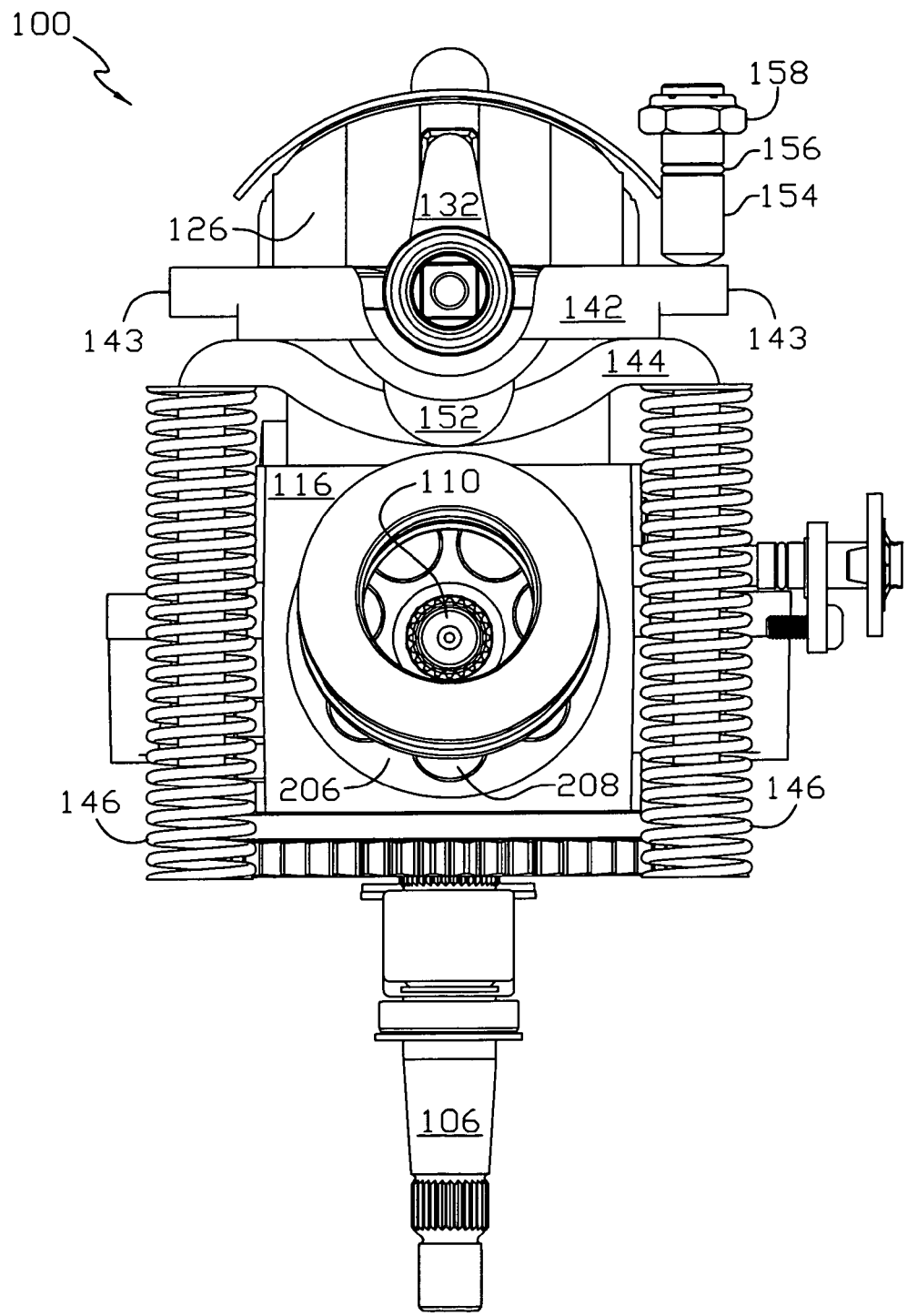
FIG. 20 is an end elevational view of the hydrostatic components shown in FIG. 18.

In this embodiment, the return to neutral feature 140 forces pump swash plates 126 to the neutral position when the corresponding trunnion arm 132 is not under stroke. In most cases, this means returning the swash plates 126 to a generally horizontal position, such as is shown in FIGS. 18 and 20, where there is insufficient axial displacement of the pump pistons 124 to cause rotation of axle shafts 121.

Because this embodiment depicts a dual hydrostatic transmission, it will be understood that there are two identical return to neutral features 140 depicted herein, and identical numerals are intended to depict identical structure.

Figure 21:
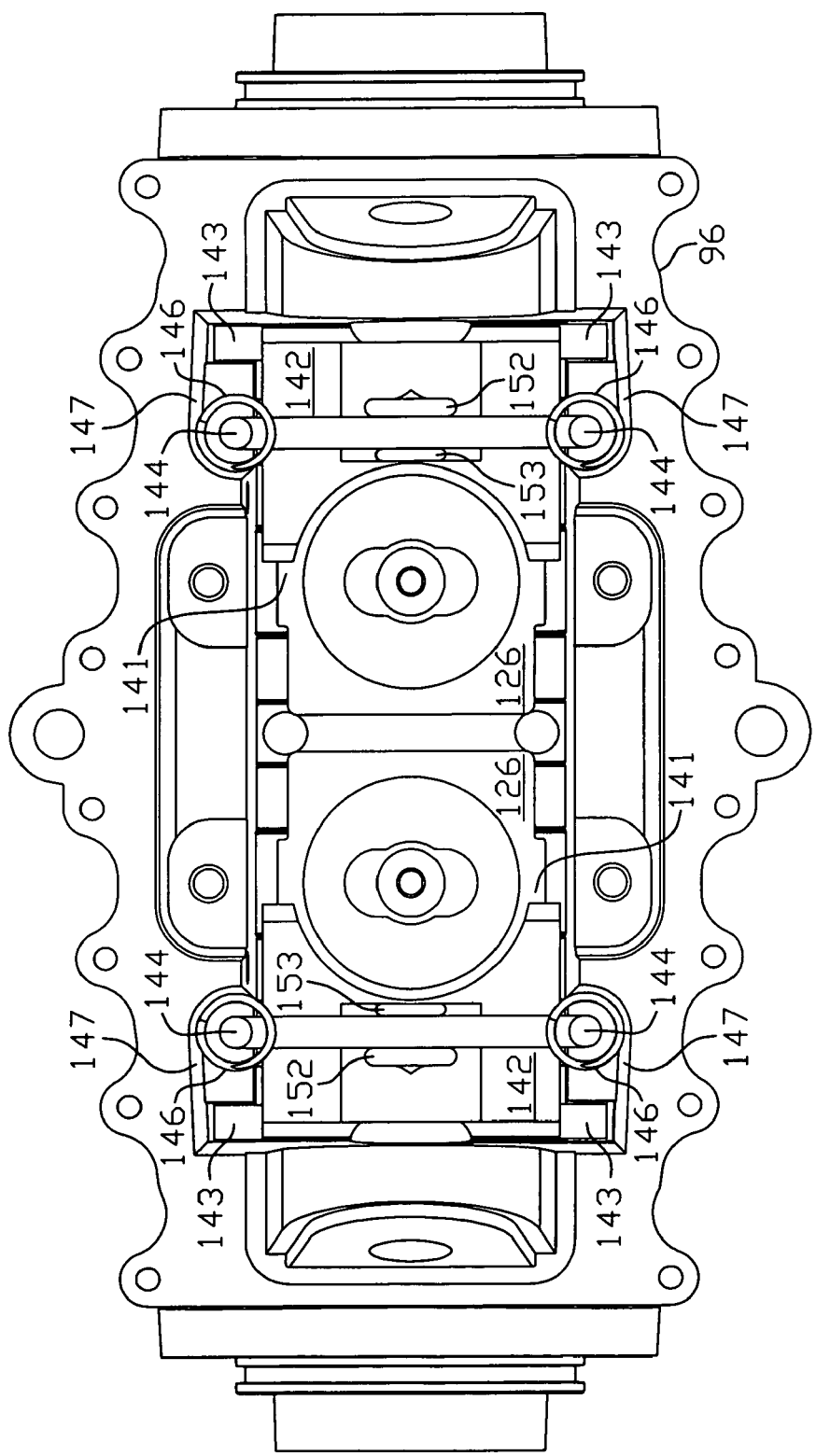
FIG. 21 is a bottom, interior view of the upper portion of the transmission housing shown in FIGS. 16 and 17 with the two pump swash plates, the two return plates and the bias arms for the internal return to neutral feature of the present invention in position.
Figure 22:
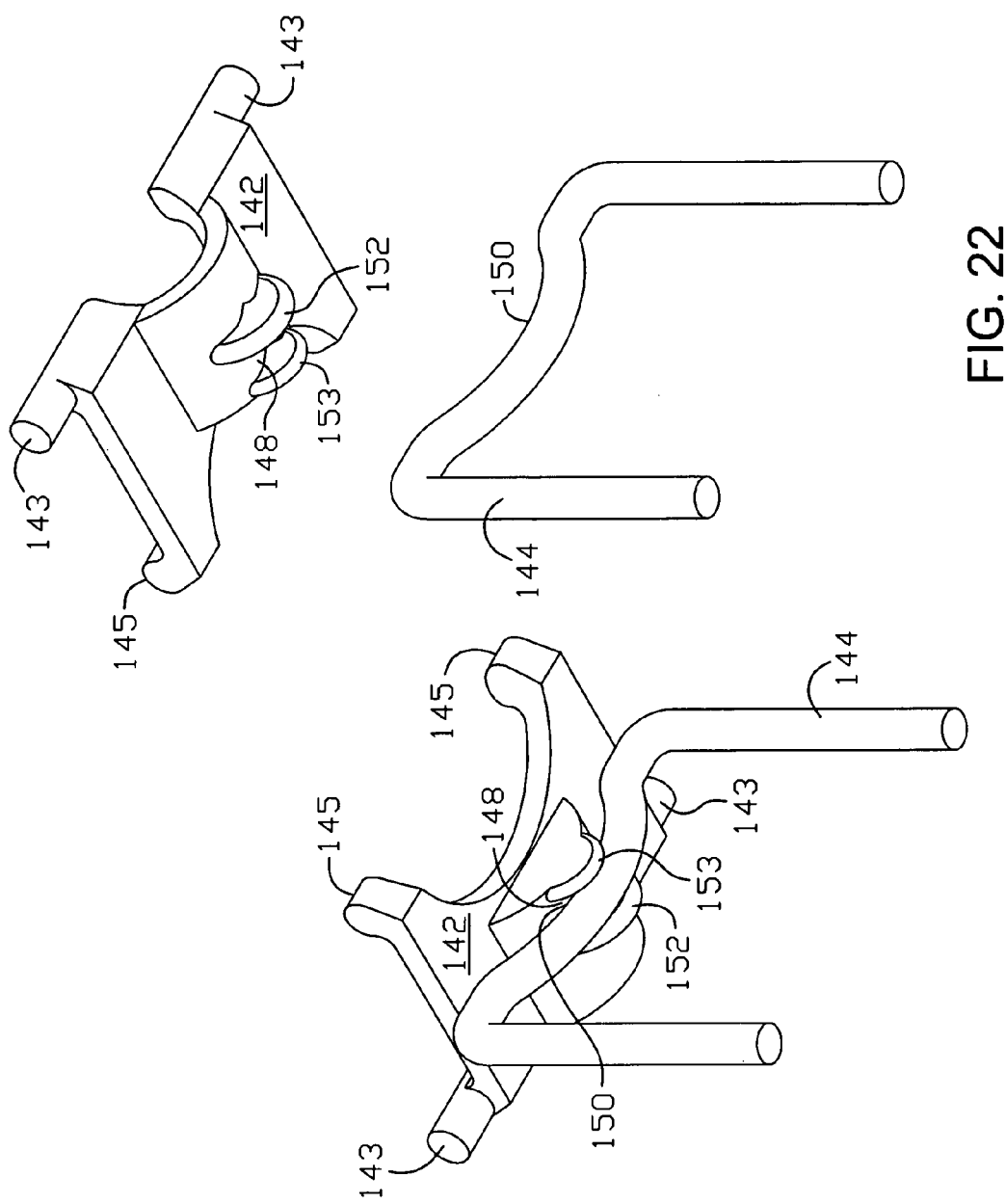
FIG. 22 is a perspective view of the two return plates and bias arms shown in FIG. 21, with one bias arm exploded to expose certain elements of the return to neutral feature of the present invention.
Figure 23:
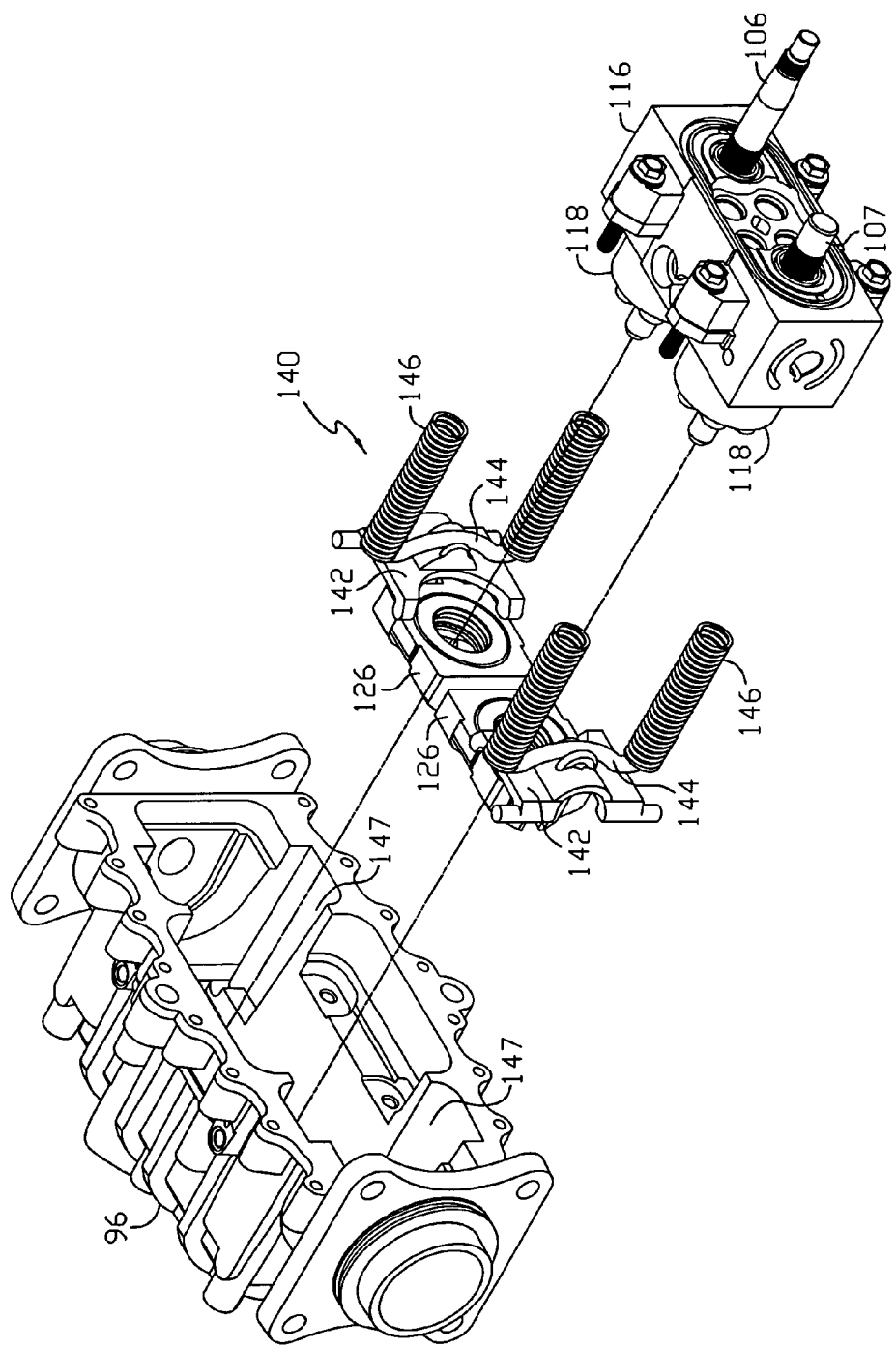
FIG. 23 is another exploded perspective view of portions of the transmission shown in FIG. 16.

A return plate 142 is mounted in housing 96 and has a pair of oppositely extending pins 143 formed therewith. As shown in FIG. 21, plate 142 can rotate within housing 96 about an axis extending through the two pins 143. At the opposite end of plate 142 are two projections 145 extending perpendicularly upward from the top surface thereof to contact surface 141 of swash plate 126.

Plate 142 also has a mating feature 148 comprising a generally curved surface having a pair of lips 152 and 153 extending downwardly therefrom. Arm 144 having a generally circular cross-section is mounted in the housing 96 and comprises a generally U-shaped member having a curved cross-piece 150 that mates with mating feature 148 on plate 142 and is held in place by lips 152 and 153. Springs 146 are mounted around each end of arm 144, and are located at one end in holes 149 and act against cover 98. Thus, when swash plate is moved into either the forward or reverse position by movement of trunnion arm 132, springs 146 will be compressed and will then provide a counteracting spring force in the opposite direction in order to return swash plate 126 to the horizontal or neutral position.

In order to keep arm 144 and its associated springs 146 in position during assembly, a mating feature 147 is provided in housing 96. Feature 147 provides a location for springs 146 to be positioned during installation of cover 98 so that springs 146 may be more easily located in mating holes 149 in cover 98. Springs 146 on the other side are preferably maintained in an identical manner.

A neutral adjust means 154 penetrates housing 96 to contact one pin 143 of return plate 142, so that the return-to-neutral mechanism 140 may be adjusted to establish a set point to coincide with a selected position, which would in most cases be the neutral position. Neutral adjust means 154 preferably has an o-ring 156 or other means of preventing oil leakage. Neutral adjust means 154 includes a locking device in the form of a nut 158 so that once neutral adjust means 154 is adjusted to an appropriate position, nut 158 may be tightened onto housing 96 to prevent further movement of neutral adjust means 154 that might tend to change the set point of return-to-neutral mechanism 140.

It is to be understood that the above description of the invention should not be used to limit the invention, as other embodiments and uses of the various features of this invention will be obvious to one skilled in the art. This invention should be read as limited by the scope of its claims only.

I claim:

1. A hydrostatic device mounted in a housing, the device comprising:
   a rotatable pump including a plurality of pistons;
   a swash plate engaged to the pump pistons and pivotable about a first axis, the swash plate having a neutral position and a plurality of stroked positions;
   a return plate engaging the swash plate and having a set position, the return plate being rotatable from the set position about a second axis that is perpendicular to the first axis;
   a bias arm engaged to the return plate to force the plate to return to the set position, the bias arm comprising a pair of legs extending generally perpendicular to the second axis and a cross member connecting the two legs; and
   a spring mounted on each leg.

2. A hydrostatic device as set forth in claim 1, further comprising an adjustment mechanism to adjust the set position of the return plate.

3. A hydrostatic device as set forth in claim 2, wherein the adjustment mechanism is accessible from outside the housing.

4. A hydrostatic device as set forth in claim 2, further comprising a lock mechanism for locking the adjustment mechanism in place.

5. A hydrostatic device as set forth in claim 1, wherein the housing comprises a plurality of mating features formed therein to locate the legs of the bias arm.

6. A hydrostatic device as set forth in claim 1, wherein the swash plate is a cradle mounted swash plate.

7. A hydrostatic device as set forth in claim 1, further comprising a center section on which the rotatable pump is mounted and a hydraulic motor mounted on the center section, wherein the center section comprises hydraulic porting formed therein to connect the pump to the motor.

8. A hydrostatic device as set forth in claim 7, wherein the pump is mounted at a right angle to the motor.

9. A hydrostatic device mounted in a housing, the device comprising:
a rotatable pump including a plurality of pistons;
a swash plate engaged to the pump pistons and pivotable about a first axis, the swash plate having a neutral position and a plurality of stroked positions:
a return plate engaging the swash plate and having a set position, the return plate being rotatable from the set position about a second axis that is different from the first axis;
a bias arm engaged to the return plate to force the plate to return to the set position, the bias arm comprising a pair of legs extending generally perpendicular to the second axis and a cross member connecting the two legs; and
a spring mounted on each leg, wherein the housing comprises a main housing element and a cover secured thereto on a plane parallel to the second axis.

10. A hydrostatic device as set forth in claim 9, wherein the cover comprises a plurality of recesses to locate the springs.

11. A hydrostatic device mounted in a housing, the device comprising
a rotatable pump for transferring hydraulic fluid and having a plurality of pump pistons;
an input shaft engaged to the pump;
a movable swash plate engaged to the pump pistons for modifying the quantity of hydraulic fluid transferred by the pump, the swash plate being pivotable about a first axis;
a return plate having a first end engaged to the swash plate by at least two contact points, the return plate being pivotable at a second end thereof about a second axis that is perpendicular to the first axis, the return plate having a set position; and
a bias arm engaged to the return plate to force the return plate to the set position, wherein the bias arm comprises a pair of generally parallel legs connected by a cross member.

12. A hydrostatic device as set forth in claim 11, wherein the set position corresponds to the neutral position of the swash plate.

13. A hydrostatic device, mounted in a housing, the device comprising:
a notatable pump including a plurality of pistons:
a swash plate engaged to the pump pistons and pivotable about a first axis, the swash plate having a neutral position and a plurality of stroked positions;
a return plate engaging the swash plate and having a set position, the return plate being rotatable from the set position about a second axis that is different from the first axis, wherein the return plate comprises a pair of engagement structures formed at a first end to engage the swash plate and the second axis of rotation is located at a second end of the return plate opposite to the first end;
a bias arm engaged to the return plate to force the plate to return to the set position, the bias arm comprising a pair of legs extending generally perpendicular to the second axis and a cross member connecting the two legs; and
a spring mounted on each leg.

14. A hydrostatic device as set forth in claim 13, wherein the bias arm engages the return plate at a location between the first end and second end of the return plate.

15. A hydrostatic device mounted in a housing, the device comprising:
a rotatable pump for transferring hydraulic fluid and having a plurality of ump pistons;
an input shaft engaged to the pump;
a movable swash plate engaged to the pump pistons for modifying the quantity of hydraulic fluid transferred by the pump, the swash plate being pivotable about a first axis;
a return plate having a first end engaged to the swash plate by at least two contact points, the return plate being pivotable at a second end thereof about a second axis that is perpendicular to the first axis, the return plate having a set position;
a bias arm engaged to the return plate to force the return plate to the set positions wherein the bias arm comprises a pair of generally parallel legs connected by a cross member; and
a rotatable motor and a center section mounted in the housing, wherein the rotatable pump and the rotatable motor are mounted on the center section at right angles to one another and the center section comprises hydraulic porting formed therein to connect the rotatable pump to the rotatable motor.

16. A hydrostatic device comprising
a first hydrostatic transmission having a first rotatable pump and first rotatable motor mounted in a housing and a second hydrostatic transmission having a second rotatable pump and second motor mounted in the housing;
a first movable swash plate engaged to the first pump for modifying the quantity of hydraulic fluid transferred thereby, the first swash plate being pivotable about a first axis;
a second movable swash plate engaged to the second pump for modifying the quantity of hydraulic fluid transferred thereby, the second swash plate being pivotable about a second axis;
a first return plate engaged to the first swash plate by at least two contact points, the first return plate being pivotable about a third axis that is different from the first axis and having a set position corresponding to the neutral position of the first swash plate; and
a second return plate engaged to the second swash plate by at least two contact points, the second return plate being pivotable about a fourth axis that is different from the third axis and having a set position corresponding to the neutral position of the second swash plate.

17. A hydrostatic device as set forth in claim 16, further comprising a first bias arm engaged to the first return plate to force the first return plate to return to its set position, the first bias arm comprising a first pair of legs extending generally perpendicular to the first axis and a first cross member connecting the two legs.

18. A hydrostatic device as set forth in claim 17, further comprising a second bias arm engaged to the second return plate to force the second return plate to return to its set position, the second bias arm comprising a second pair of legs extending generally perpendicular to the second axis and a second cross member connecting the second pair of legs.

19. A hydrostatic device as set forth in claim 18, wherein the third axis is perpendicular to the first axis.

20. A hydrostatic device as set forth in claim 19, wherein the fourth axis is perpendicular to the second axis.

21. A hydrostatic transmission as set forth in claim 16, further comprising a first adjustment mechanism to adjust the set position of the first return plate.

22. A hydrostatic transmission as set forth in claim 21, further comprising a second adjustment mechanism to adjust the set position of the second return plate.

23. A hydrostatic transmission as set forth in claim 16, wherein the first and second axes are collinear.

24. A hydrostatic transmission as set forth in claim 23, where the third axis is parallel to the fourth axis.

25. A hydrostatic device mounted in a housing, the device comprising
- a rotatable pump for transferring hydraulic fluid and having a plurality of pump pistons;
- an input shaft engaged to the pump;
- a movable swash plate engaged to the pump pistons for modifying the quantity of hydraulic fluid transferred by the pump, the swash plate being pivotable about a first axis;
- a return plate having a first end engaged to the swash plate by at least two contact points, the return plate being pivotable at a second end thereof about a second axis that is different from the first axis, the return plate having a set position;
- a bias arm engaged to the return plate to force the return plate to the set position, wherein the bias arm comprises a pair of generally parallel legs connected by a cross member;
- a spring mounted on each of the legs; and
- an adjustment mechanism to adjust the set position of the return plate and a means for locking the adjustment mechanism in a single position.

* * * * *

UNITED STATES PATENT AND TRADEMARK OFFICE
CERTIFICATE OF CORRECTION

PATENT NO. : 6,964,164 B1
DATED : November 15, 2005
INVENTOR(S) : Thomas J. Langenfeld It is certified that error appears in the above-identified patent and that said Letters Patent is hereby corrected as shown below:

Column 7,
Line 43, delete "1110" and replace with -- 110 --.

Column 9,
Line 51, delete "notable" and replace with -- rotatable --; delete "pistons:" and replace with -- pistons; --.

Column 10,
Line 7, delete "ump" and replace with -- pump --.

Signed and Sealed this

Twenty-first Day of March, 2006

JON W. DUDAS
*Director of the United States Patent and Trademark Office*